Dec. 30, 1958

G. B. BASHAW 2,866,668

SIMPLIFIED BEARING INSERT

Filed Aug. 9, 1956

INVENTOR.
GERALD B. BASHAW
BY
Cook and Schemerhorn
Attorneys

United States Patent Office 2,866,668
Patented Dec. 30, 1958

2,866,668

SIMPLIFIED BEARING INSERT

Gerald B. Bashaw, Portland, Oreg.

Application August 9, 1956, Serial No. 603,037

1 Claim. (Cl. 308—56)

This invention relates, in general, to journal bearings for axles, and more specifically relates to a bearing insert for said journal bearings.

The bearing insert of the present invention is intended primarily for use as a journal bearing for railroad cars, but may have application in bearings for other types of equipment. In the conventional bearing housing structure for railroad cars, there is generally provided a bearing backing or shell member and a wedge member which engages and rides on the top surface of the shell member. The shell member has an arcuate bottom recess which is provided with a babbitt lining for engaging the upper portion of the axle journal. In some devices the babbitt lining is bonded to the shell member, and in other devices said shell members are provided with special grooves, pockets or other means for holding the babbitt lining in place. When the babbitt lining is bonded to the shell member, special babbitting processing is thus necessary to secure such a bond, and when the babbitt lining is partially embedded in grooves or pockets therein or is held in place by cooperating projections and depressions, special machine work is thus required in the manufacture of the shell member. Great care and fitting become necessary in order to see that present babbitt lined bearings have ample bearing surface because the wheel axles often develop an unplaned surface due to wear, and, when insufficient bearing surface is exposed to the babbitt lining, further bearing trouble develops almost immediately.

When a railroad car develops an overheated bearing assembly, it is necessary to stop the train, treat the hot bearing and then find proper switch-out facilities so as to disengage the car from the train and put it on a siding. Then it is necessary to re-brass the bearing so as to bring the car to a repair terminal where a new axle is necessarily inserted because of the scoring of its journal. Such overheating of the bearings causes train delays, damage to equipment, and, in addition, jeopardizes lives and property.

A principal object of the present invention is to provide an improved bearing insert for railroad car bearing assemblies which is intended to be substituted for the usual babbitt lining to give more lasting, dependable service and which may be installed in or removed from a bearing housing in a minimum of time and with little inconvenience to save delay and cost of repair and to prevent further damage to the bearing surface.

A further object is to provide a pre-cast bearing insert which may be installed in conventional bearing housings without requiring special parts or machining of existing parts to thereby reduce the cost of replacing worn bearings.

A further object is to provide an improved bearing insert having means cooperating with bearing parts for assuming an assembled locked position but being free of interconnecting structure whereby said insert is freely engageable with and disengageable from said parts when desired.

A further object is to provide an improved bearing insert which is simplified in construction, which has uninterrupted surface areas intermediate its ends to reduce to a minimum the die casting and for machining in manufacture, and which is designed for universal application to present railroad bearings.

A still further object is to provide a low-cost bearing insert which is of reduced size and weight relative to a babbitt lining.

The present insert or liner comprises, in general, a body of segmental cylindrical shape adapted to engage the journal of a railroad car axle. The insert fits in the usual bearing back or shell member which is in turn engageable by a wedge member. The insert has improved means comprising side flanges and an end flange or lip which serve to prevent shifting of the insert relative to the bearing shell. The invention will be better understood and additional objects and advantages will become apparent from the following description taken in connection with the accompanying drawings which illustrate a preferred form of the invention. It is to be understood, however, that the invention may take other forms and that all such modifications and variations within the scope of the appended claim which will occur to persons skilled in the art are included in the invention.

Figure 1:
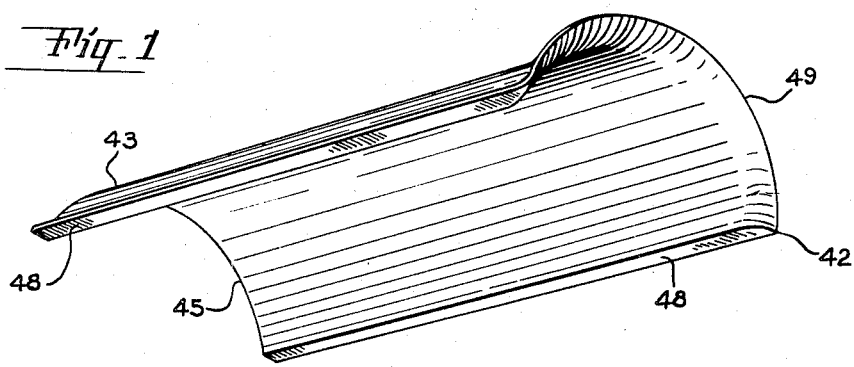
Figure 1 is a perspective view of the underside of the present insert, showing the side flanges and end lip.
Figure 2:
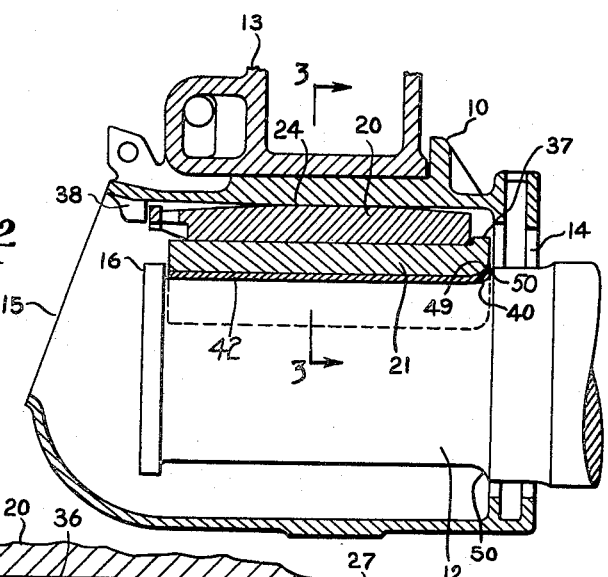
Figure 2 is a longitudinal sectional view of a railroad car bearing housing with the present insert installed therein.

Referring first to Figure 2, there is shown a railroad car bearing housing or journal box 10 which is in common use. The bearing housing 10 establishes bearing connection between an axle journal 12 and car structure 13, and has an end opening 14 for receiving the axle journal. The opposite end of the housing also is provided with an opening 15 through which a lubricant may be applied, and also through which access may be had to the bearing parts. The axle journal 12 is provided with an end flange 16. The bottom of the housing is filled with absorbent packing, not shown.

Enclosed within the housing 10 is a wedge or bush member 20 and a bearing back or shell member 21. Wedge 20 has a substantially flat upper surface 24, Figure 2, and a flat bottom surface 25. Side portions 26 are provided on the wedge and have downwardly sloping inner surfaces 27 which, together with the face 25, form a longitudinal inverted channel-shaped recess. This member is held against rotation within the housing 10.

The bearing back or shell member 21, which preferably comprises a hard metal such as steel, has an upper flat face 30 and downward sloping side surfaces 31 which, together, form a configuration adapted to fit within the channel-shaped recess of the wedge 20. Bearing shell member 21 also has downwardly extending lip portions 33 having flat bottom surfaces 34 disposed longitudinally on each side of a central arcuate recess 36. In assembled relation of the parts, the wedge 20 seats on the bearing shell member 21 and the contoured mating surfaces thereof prevent relative rotation of these parts. As seen in Figure 2, one end of the bearing shell member 21 has an upwardly extending lip 37, and this lip is engageable by one end of the wedge 20 whereby relative longitudinal movement of the two parts is also prevented. The opposite end of the wedge 20 engages a lug 38 on the housing and longitudinal movement of the two parts is thus restrained. One end of the bearing shell 21 is rounded at 40 on its bottom edge.

The bearing insert or liner of the present invention, identified by the numeral 42, comprises a segmental-cylindrical body portion having an upper curved surface 43 contoured to fit the recess 36 of the bearing shell member 21. The insert is thickened at 44 intermediate its ends, and has a lower concave surface 45 having a radial dimension the same as the journal 12 for providing a continuous bearing surface between these two members throughout the length of the insert.

Figure 3:
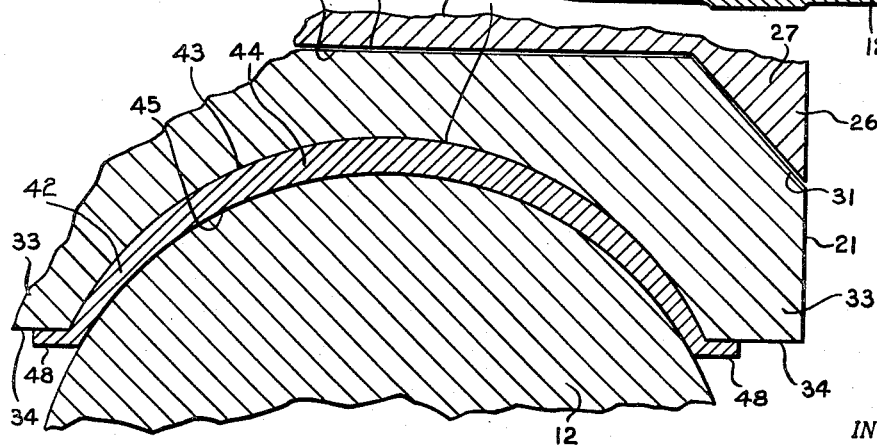
Figure 3 is a sectional view taken on the line 3—3 of Figure 2.

The insert is provided with horizontal side flanges 48 extending the length thereof, and is also provided with an upwardly curved flange or lip 49 on one end. In the assembled position of the bearing parts the side flanges 48 engage the bottom surfaces 34 of the bearing shell member 21, as seen in Figure 3. The upper side of the upwardly curved lip 49 engages the rounded bottom edge 40 of the shell member and the under side of lip 49 engages a rounded shoulder 50 on the journal 12. The opposite end of the insert from the lip 49 is disposed behind the inner edge of the flange 16 on the journal 12, whereby relative longitudinal movement is prevented between the shell member 21 and its insert and also between the journal and the insert. Relative rotative movement between the insert and the shell member 21 is prevented by the positive engagement of the flanges 48 with the bottom surfaces 34, and it is thus apparent that the parts are held locked in assembled relation without the use of fastening means such as keys, pins, or the like. No machining is therefore necessary on existing shell members for receiving inserts 42.

The insert 42 is intended to be substituted for the usual babbitt and/or other lining used in present railroad car bearing structures, and it is preferably cast from a special bronze-like material called Bashaw Metal to provide a good bearing surface with the journal, the concave surface 45 of the insert being machined to present a smooth bearing face. The top convex surface is likewise smooth. Installation of the insert is easily accomplished by jacking the car off the journal and removing, through the open end 15 of the housing, the wedge and bearing shell. When it is intended to substitute the present insert for a babbitt lining, the new insert is merely placed in a shell 21 from which the old babbitt material has been removed, and then the new assembly is slipped into the housing and the bearing is again ready for use.

The installation of the insert can be accomplished in a minimum of time and with a minimum of expense. This insert is adaptable for mounting in all present railway bearing housings, and, as stated hereinbefore, no machining or other alteration need be performed on the bearing parts for receiving the present insert, except for the removal of the babbitt lining in structures already in existence. Even though an existing shell member is equipped with pockets or grooves for receiving a babbitt lining, the insert can be readily used in place of the babbitt as the existing pockets or grooves do not interfere with the installation. In the casting of new shell members for use with the present insert, no special machining or processing is necessary as would be the case where the lining is secured or bonded to the shell member or where cooperating projections and depressions are utilized in mating surfaces. The installation may be accomplished without special skill and, furthermore, the present invention eliminates errors in tolerance which may occur in a babbitting process.

The insert of the invention, being made of a special alloy by a special process, has been found not to fatigue, seize, freeze, score nor wipe, nor waste grab, all common and distressing faults of conventional babbitt bearings. Also, the insert has better heat dissipating qualities than babbitt material and better resistance to road shocks. An insert for a typical railway bearing weighs only three pounds in contrast with twenty-three pounds for the conventional replacement unit. The inserts are not fragile and will nest compactly, thereby greatly reducing storage, handling and shipping problems. No special care in handling is required. The bearing surface is not readily scratched or damaged. Salvage operations are facilitated.

Having now described my invention and in what manner the same may be used, what I claim as new and desire to protect by Letters Patent is:

In a railway bearing assembly having a bearing shell member with an arcuate recess in its under side and flat bottom surfaces on opposite sides of said recess, a readily removable pre-cast bronze alloy bearing insert of generally segmental cylindrical shape having a central portion of great thickness than its edge portions and having a smooth convex top surface to fit said arcuate recess, longitudinal side flanges on said edge portions disposed in a common plane to bear against said flat bottom surfaces of said shell member for preventing rotation of the insert, and an upwardly curved lip on one end of said insert engageable with one end of said shell member to prevent longitudinal movement of said insert in said shell member, whereby said insert is confined and held in assembled relation between said shell member and an axle journal without attachment to said shell member and is readily removable when as a unit from said shell member said shell member is raised from said journal.

References Cited in the file of this patent

UNITED STATES PATENTS

| Number | Name | Date |
|---|---|---|
| 127,784 | Meneely | June 11, 1872 |
| 182,525 | Lungren | Sept. 26, 1876 |
| 826,202 | Stucki | July 17, 1906 |
| 866,035 | Jones | Sept. 17, 1907 |
| 1,054,189 | Ekstedt | Feb. 25, 1913 |